Sept. 23, 1969    F. G. REA    3,469,176
CONSTANT CURRENT REGULATOR
Filed May 27, 1966    3 Sheets-Sheet 2
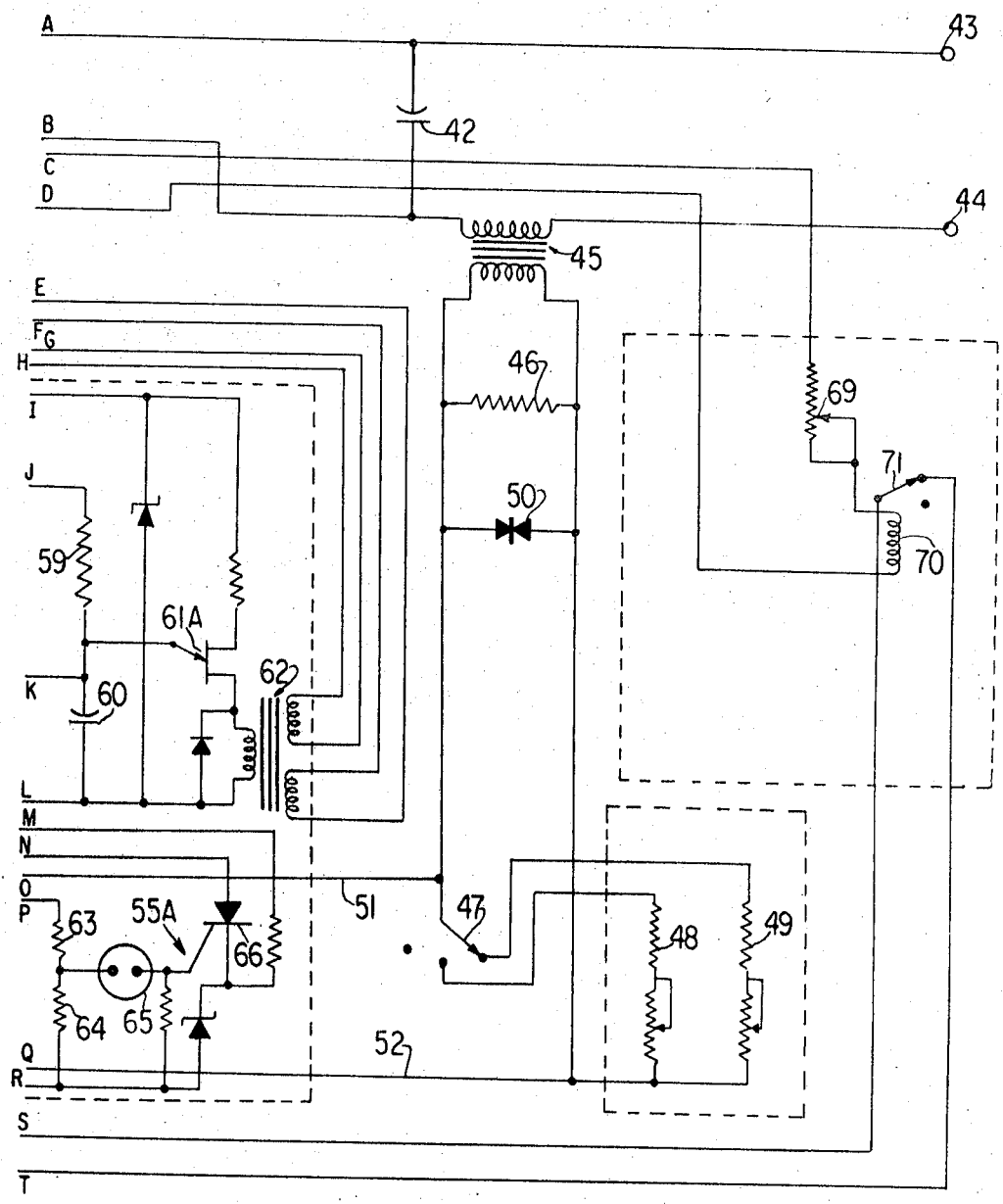
FIG. IB
INVENTOR
FRED G. REA
BY
Smythe & Moore
ATTORNEYS United States Patent Office 3,469,176
Patented Sept. 23, 1969

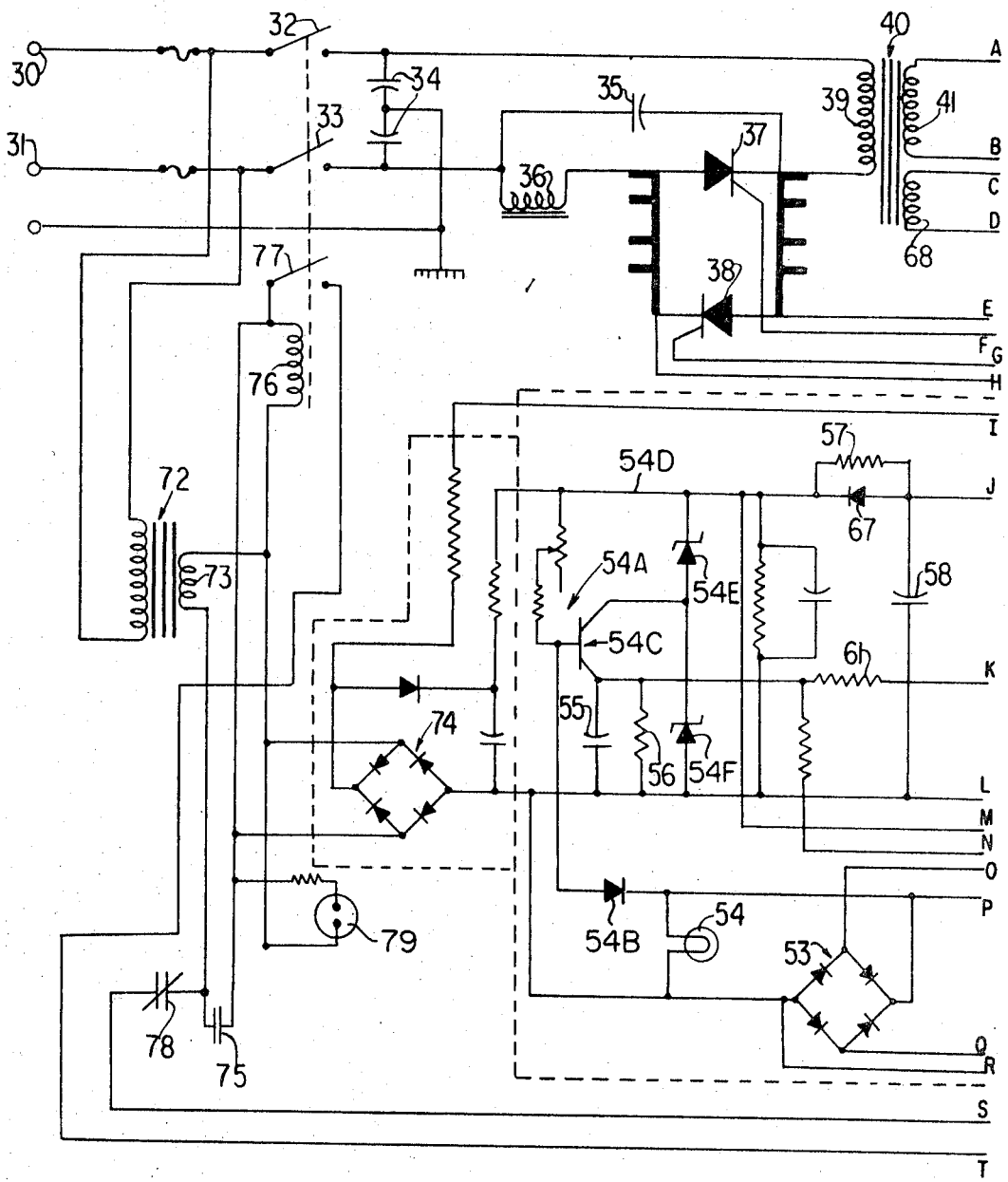
FIG. IA

3,469,176
CONSTANT CURRENT REGULATOR
Fred G. Rea, Watertown, Wis., assignor to Sola Basic Industries, Inc., Milwaukee, Wis., a corporation of Wisconsin
Filed May 27, 1966, Ser. No. 553,376
Int. Cl. G05f 1/40
U.S. Cl. 323—4          4 Claims

ABSTRACT OF THE DISCLOSURE

A current regulator for airport lighting and like loads wherein a capacitor shunted high leakage reactance transformer-regulator provides for coarse regulation, and an SCR control circuit connected to the input side of the transformer-regulator effects fine regulation. Suitable circuitry also provides tare and slow starting voltages and recovery of the control system in the event of excessive voltages.

---

Figure 2:
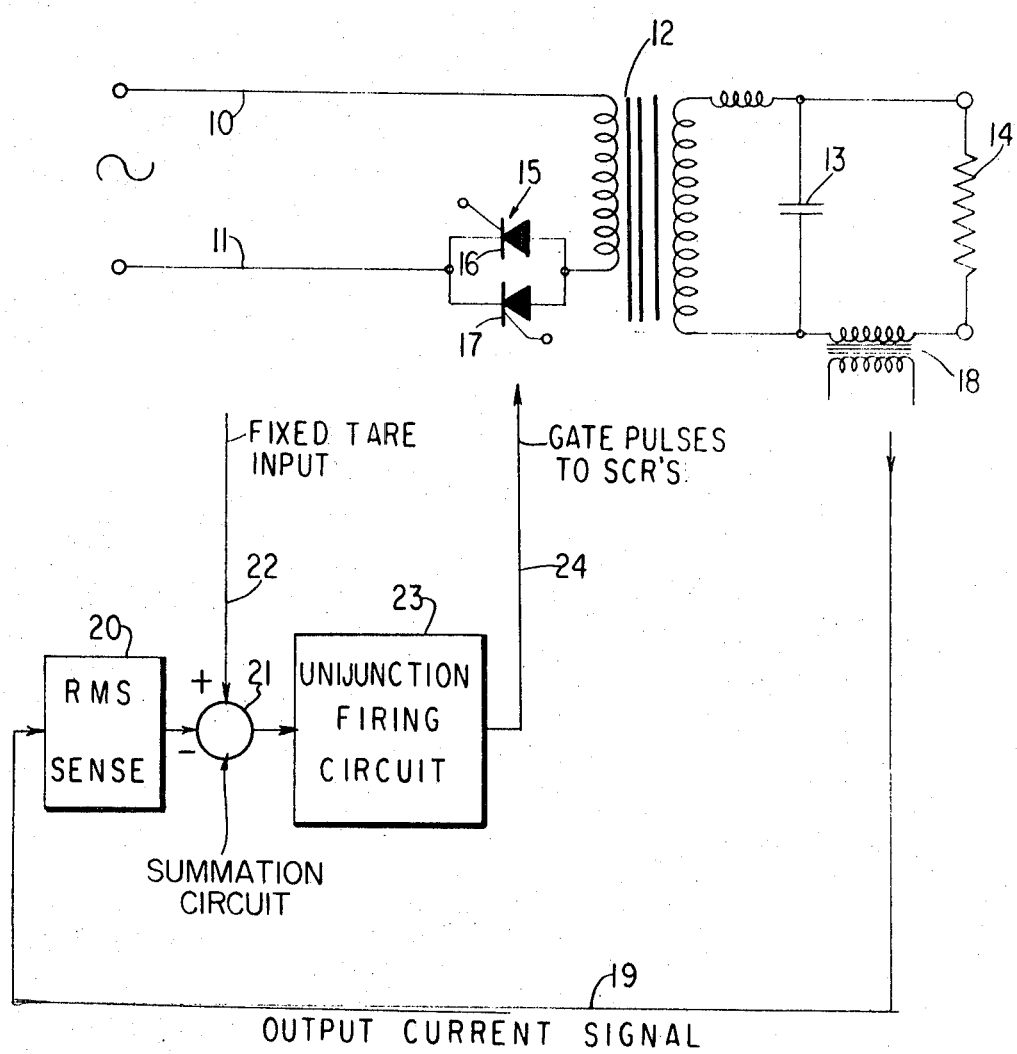

This invention relates to current regulators and more particularly to a regulator for airport lighting and other constant current lighting and load systems.

Prior devices having the desired current regulating characteristics have been bulky and heavy. Space restrictions in places such as airports make it desirable to reduce the size of the regulators as far as possible.

An object of the present invention is to provide a compact current regulator for airport lighting or the like which utilizes relatively small and light-weight transformers and other parts while maintaining a high degree of regulation.

A further object is to provide a current regulator of the high leakage reactance transformer type in which the size and weight of the transformer required to produce the desired regulation is substantially reduced.

A further object is to provide a current regulator of the high leakage reactance transformer type in which the transformer is of a size normally capable of effecting only coarse regulation and fine control is effected at the input side of the transformer, thereby substantially reducing the size, weight and cost of the regulator.

A still further object is to provide a new and improved constant current regulator and control circuit therefor.

In one aspect, the regulator of the invention comprises a regulating transformer of the well known high leakage reactance, capacitor shunted type but of a size as to provide normally only coarse regulation, a silicon-controlled rectifier or SCR network for effecting fine control of the regulation interspersed in the A.C. power line to the input side of the transformer, a means for sensing the root-mean-square (RMS) voltage or current at the output side of the regulator and producing a signal proportional to variations in such voltage or current from a predetermined constant value, and means including a unijunction transistor for controlling the conduction of the SCR network in accordance with signals from the sensing means.

The above and other objects, advantages and features of the invention will be apparent from the following description and the accompanying drawings which exemplify one embodiment of the invention.

In the drawings:

FIGS. 1A and 1B show a regulator and one type of control circuit for carrying out the invention; and FIG. 2 is a block diagram of the regulator and control circuit shown in FIGS. 1A and 1B.

Referring first to FIG. 2, A.C. power is fed across lines 10, 11 to a regulating transformer 12. The transformer 12 is of the well known high leakage reactance type provided with an integral magnetic shunt and a shunting capacitor 13 on the output side. The output from transformer 12 and capacitor 13 is adapted to feed any desired load requiring a constant current such as an airport lighting system indicated generally by the resistance 14. Interposed in power line 11 on the input side of transformer 12 is a SCR network indicated generally by the reference numeral 15 and shown as comprising a pair of SCR's 16 and 17. Interposed in one of the output lines of the transformer-capacitor regulator 12, 13 so as to be in series with the load 14 is the primary of a current transformer 18. Transformer 18 thus produces a sensing signal that is proportional to the output load current. This signal is fed through line 19 to a RMS sensing circuit, shown schematically in block 20, which produces a signal proportional to variations in the output or load current signal from a predetermined constant current reference signal. The output signal from the RMS sensing circuit is fed to a summation circuit shown by circle 21 where it is combined with a fixed tare voltage 22 and is used to control the operation of a unijunction transitor firing circuit, indicated generally by the block 23, which feeds gate pulses to the SCR's 16 and 17 through line 24. The constant tare voltage 22 maintains the unijunction transistor at a proper operating or firing voltage during periods of no-correction signals, thereby reducing time errors in the firing of the SCR's.

In the circuit thus described, the combination of the high leakage reactance transformer 12 and the shunt capacitor 13 will give an approximate constant current output, the parts being so designed as to give only a coarse control, thereby reducing the cost and size of the parts used for this purpose. By feeding the output from such a coarse control arrangement to the RMS sensing and unijunction firing circuits, a fine control is added thereto by the SCR network. Thus, by the use of this combination of circuitry, the size of the control and cost thereof can be significantly reduced.

Referring to FIGS. 1A and 1B, power is fed at 30 and 31 through contactors 32 and 33 and an RFI suppression network consisting of capacitors 34 and 35 and inductance 36 to a pair of SCR's 37 and 38 which feed the primary 39 of a current regulating transformer 40. Transformer 40 is a high leakage reactance transformer having a magnetic shunt and a shunting capacitor 42 connected across its secondary 41, as is well known in the art, and feeds output terminals 43 and 44 through a sensing or current transformer 45.

A fixed resistor 46 connected across the secondary of transformer 45, and a pair of adjustable calibrating resistors 48 and 49, which may be selectively connected in parallel with resistance 46 by a switch 47, apply a voltage which is proportional to the output load current of transformer 40 to a pair of lines 51 and 52 which feed a full-wave rectifier 53. A suppressor 50 may be connected across resistor 46 to prevent excessive voltages in the sensing portion of the circuit. The output of rectifier bridge 53 is fed to a light bulb or other RMS sensing element 54 in which the resistance is proportional to the current and which controls a RMS sensing circuit 54A as more particularly described in copending application Ser. No. 553,375, filed May 27, 1966 to develop a signal voltage proportional to the output load current of transformer 40 across capacitor 55 and resistor 56. As more specifically described in the co-pending application, the light bulb sensing element 54 is alternately heated to vary its resistance in accordance with the output current and then sensed through diode 54B to provide a current which is compared by transistor 54C with a reference current supplied by line 54D and Zeners 54E and 54F. The output of transistor 54C develops an output signal across resistance 56 and capacitor 55 which is proportional to the variations of the output load current from the reference current.

The signal voltage from resistance 56 and capacitor 55 of the sensing circuit is fed through a series resistance 61 to a capacitor 60 connected to the emitter of unijunction transistor 61A which controls the firing of the unijunction transistor in a manner well known in the art. A fixed tare voltage or bias for the unijunction transistor to condition properly the transistor is provided by a resistance 59 connected in series with capacitor 60 across a source of constant voltage. To provide a slow start in the firing of the unijunction transistor when the system is turned on, a shunt condenser 58 is connected across the source of constant tare voltage ahead of resistance 59 and capacitor 60 and is fed by a series resistor 57 connected in the line of constant voltage. Thus when the system is first turned on, the current through resistor 57 causes the voltage across condenser 60 to build up slowly, thereby causing the tare or bias voltage applied to capacitor 60 and unijunction transistor 61A to build up slowly. When the system is turned off, the capacitor 58 discharges through diode 67 and conditions the system for another slow start through resistance 59 and capacitor 58.

The RMS sensing element 54 is slow in response and thus it is necessary or desirable to provide a circuit such as shown at 55A for quickly reducing the output of the main circuit when the load is suddenly reduced in resistance. A sudden lowering of the load resistance will cause a sudden increase in the voltage across the output of rectifier bridge 53 which is applied across series resistors 63 and 64 and results in the firing of a neon tube 65 or similar triggering device. This changes the bias on silicon-controlled rectifier 66, thereby firing the rectifier and rapidly discharging capacitor 55 to reduce the output signal. The operation of the circuit 55A is merely temporary until the coarse regulator 40 can respond.

A winding 68 on the high reactance transformer 40 operates a relay 70 and contactor 71 through a series resistor 69 in the event of excessive voltage on the output side of the transformer. The normally closed contactor 71 is connected in series with the secondary 73 of a transformer 72 which is connected to the input power source 30, 31 and provides power for the control circuit through a full-wave rectifier 74. A manually operable push button type of switch 75 energizes a relay 76 to close a normally open contactor 77 and furnish power to the rectifier bridge 74. Contactor 77 also closes a holding circuit for relay 76, and relay 76 also operates to close the main power supply to transformer 40 through the switch or contactors 32 and 33. A normally closed switch 78 connected in the power line from secondary 73 of transformer 72 provides for manually turning off the entire system by de-energizing relay 76. In like manner, overvoltage relay 70 cuts off the entire system by opening contactor 71 connected in series with the holding circuit of relay 76. A neon lamp 79 or the like indicates when the system is turned on.

The operation of the regulator and its control system is as follows. Momentary closing of manual switch 75 energizes relay 76 to close contactors 32, 33 and 77 and furnish power to the regulator transformer 40 and the D.C. supply bridge 74. The SCR's 37 and 38 are set normally to fire at such an angle as to provide a normal supply current to the primary 39 of transformer 40. Secondary 41 of transformer 40 and capacitor 42 supply a substantially constant current to a lighting or other substantially resistive type of load in a manner well known in the art of high reactance transformer regulators. The parts are of such size, however, as to provide only a coarse regulation of the output load current as above set forth. The output load current from transformer 40 feeds through current transformer 45 to provide a sensing voltage or signal which is proportional to the load current and which is fed to sensing element 54 through the rectifier bridge 53. During every half cycle of the supply voltage, the sensing circuit 54A compares the RMS of the sensing signal with a constant current reference signal supplied from D.C. bridge 74 as more particularly set forth in the aforesaid copending application Ser. No. 553,375, filed May 27, 1966, and produces a signal build-up across resistor 56 and capacitor 55 in accordance with the error, if any, in the load current of transformer 40. The signal voltage across resistance 56 and capacitor 55 is fed to unijunction transistor 61A through capacitor 60 and, depending upon the error in the load current and therefore the time during a half cycle required for a proper voltage to build across condensers 55 and 60, fires the unijunction transistor 61A. This in turn fires the SCR's 37 and 38 through transformer 62 at such time in each half cycle as to increase or decrease the current supplied to the primary 39 of transformer 40 and thereby superimpose a fine control or regulation on the output of transformer 40. The control circuit including resistor 59 provides a normally constant tare voltage or bias for the emitter of unijunction transistor 61A for the purpose above described, and resistor 57 and capacitor 58 provide a slow start for the fine regulating system as also above described. In the event of a sudden decrease in load, circuit 55A temporarily renders the sensing circuit 54A inoperative to facilitate in recovery of the control system, and in the event of excessive voltage at the output side of transformer 40, the relay 70 operates to shut down the entire system. The system can be manually shut down by operating switch 78.

The following is merely an example of the reduction in the size of the control and cost.

For a 6.6 ampere constant current resistance load varying from 0 to 90 ohms, high reactance transformer 40 could be used with a reactance of 70 ohms and open circuit secondary 41 voltage of 462 volts. A capacitor 42 with 70 ohms reactance and approximately 5 kilovolt amperes reactive rating would give complete regulation without SCRs or other fine control means. A capacitor 42 with 210 ohms reactance would require only 1.2 k.v.a.r. and therefore be much less costly. This example would give ±13.5% regulation, the additional control being accomplished by a control means such as SCR's 37, 38 driven by a signal derived from a sensing means such as current transformer 45. Such control means would vary open circuit secondary 41 voltage between 454 and 595 volts to provide fine control, reducing regulation from the coarse regulation such as ±13.57 to a more useful value. Complete regulation by control means such as SCR's 37, 38 without coarse control by reactive means such as high reactance transformer 40 and capacitor 42 would also be more costly than the combination as described above.

It will be evident from the above description that there is provided a current regulator and control system that provides a high degree of regulation and at the same time substantially reduces the size, weight, overall dimensions and cost of the regulator and its component parts.

What is claimed is:

1. In a constant current regulating means, the combination of a high leakage reactance transformer having an input and an output, means for connecting an A.C. source of power to said input, a capacitor means connected across said output, the size and design of said capacitor and said high leakage reactance transformer being such as to provide a relatively coarse regulation of output current supplied by the transformer and capacitor for a given voltage and load rating, a SCR network connected in the input to said transformer, output current sensing means, and means operable by said sensing means for controlling the conduction of said SCR network to provide a fine regulation of said output current.

2. A combination in accordance with claim 1 in which said output sensing means includes a RMS current sensing element providing a current proportional to the output current and a reference current comparator means, the output of said sensing means controlling the operation of a unijunction transistor for controlling conduction of said network.

3. A combination as set forth in claim 2 in which said combination includes an over-current circuit means for sensing a rapid change in load current, said over-current circuit means being operative temporarily to render said sensing means inoperative, and said over-current circuit means includes a silicon controlled rectifier and a gaseous discharge tube for firing said silicon controlled rectifier.

4. A combination as set forth in claim 2 in which the combination includes a means for providing a D.C. source of power, a means including a resistor and capacitor connected to said D.C. source of power to provide a normally constant tare biasing voltage for said unijunction transistor, and a signal from said sensing means is applied across said capacitor to fire the unijunction transistor.

References Cited

UNITED STATES PATENTS

| 3,197,691 | 7/1965 | Gilbert. | |
|---|---|---|---|
| 3,247,451 | 4/1966 | Hauck | 315—311 |
| 3,261,980 | 7/1966 | McCartney et al. | 323—9 X |
| 3,262,045 | 7/1966 | Hauck | 323—22 X |
| 3,293,537 | 12/1966 | Sola | 323—6 |
| 3,303,414 | 2/1967 | Jensen | 323—9 |

JOHN F. COUCH, Primary Examiner

A. D. PELLINEN, Assistant Examiner

U.S. Cl. X.R.

315—206, 307; 323—9, 22